Figure 1:
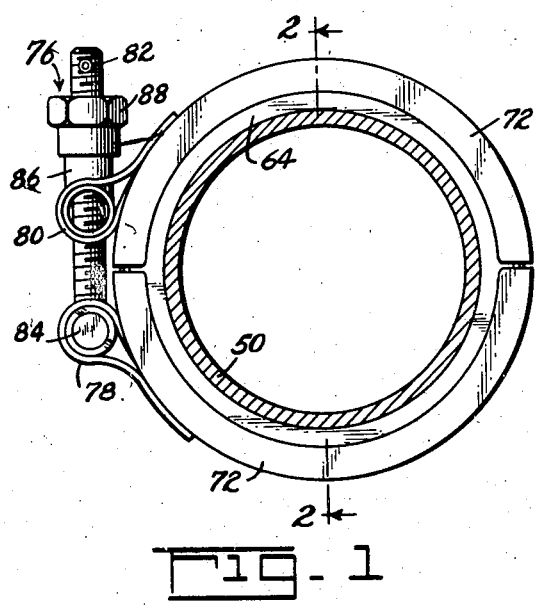

Feb. 8, 1949.   H. C. HILL ET AL   2,460,984
PIPE CONNECTION
Filed June 6, 1944

INVENTORS
HENRY C. HILL
WILLIAM H. FRANCISCO, JR.
BY
ATTORNEY

Patented Feb. 8, 1949

2,460,984

UNITED STATES PATENT OFFICE 2,460,984

PIPE CONNECTION

Henry C. Hill, Montclair, and William H. Francisco, Bloomfield, N. J., assignors to Wright Aeronautical Corporation, a corporation of New York Application June 6, 1944, Serial No. 538,964

3 Claims. (Cl. 285—86)

This invention relates to hose or pipe clamps and more particularly to a hose or pipe clamp capable of withstanding high internal pressures, and at the same time, permitting flexibility between the pipe parts clamped together and occupying very little space. The clamp has been designed to provide means for securing an intake pipe of an internal combustion engine to a cylinder head. However, as will appear from the following description, the clamp is not limited to this particular use, but is of general application.

In a radial cylinder engine in which the cylinders are radially mounted about a crank case, there is a substantial amount of relative vibration between the various cylinder heads and the crankcase, and accordingly there is considerable relative movement between the two ends of each of the intake pipes. Also, when the engine backfires, there is considerable pressure in the associated intake pipes. Accordingly, it is an object of this invention to provide clamping means for securing an intake pipe to its cylinder head and which is capable of withstanding high pressures, and at the same time provides some flexibility between the parts connected. Also, because of space limitations on aircraft engines, it is a further object of this invention to provide a clamp occupying very little space.

Figure 2:
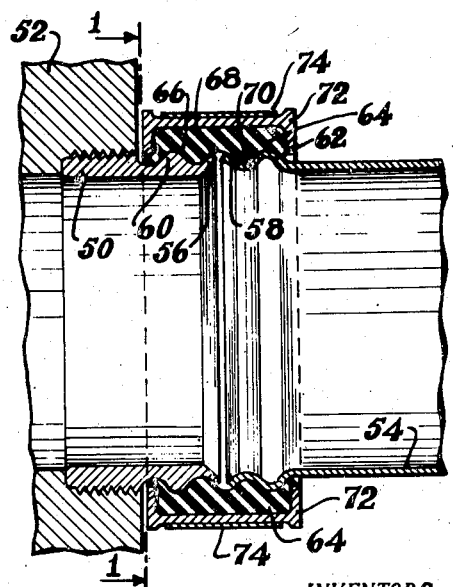

Other objects of this invention will become apparent upon reading the annexed detailed description in connection with the drawing in which:

Figure 1 is a transverse sectional view through a clamp embodying the invention and taken along line 1—1 of Figure 2; and Figure 2 is an axial section taken along line 2—2 of Figure 1.

In Figures 1 and 2, a short pipe or nipple 50 is threaded into a cylinder head 52 and extends therefrom for clamping attachment to an intake pipe 54. The facing ends of the nipple and intake pipe are provided with external annular beads or flanges 56 and 58 respectively and with axially spaced external annular beads or flanges 60 and 62 respectively. An annular member 64 of rubber or other similar resilient material is provided with three annular internal grooves 66, 68 and 70. The end annular grooves 66 and 70 of the annular member 64 are adapted to be disposed over the flanges 60 and 62 with the intermediate annular groove 68 disposed over a composite bead formed by the flanges 56 and 58 at the ends of the nipple and intake pipe respectively. The annular grooves 66, 68 and 70 are so spaced as to provide for a small axial clearance between the facing ends of the nipple and intake pipe, thereby avoiding any chafing between these members.

A pair of semi-circular metal members 72 are adapted to be clamped about the annular resilient member 64 and a flexible clamping band 74 is adapted to clamp the semi-circular members 72 and the annular resilient member 64 tightly about the nipple and intake pipe, as illustrated. Means 76 are provided for drawing together the ends of the flexible band 74. As illustrated said means comprises loop portions 78 and 80 formed on the ends of the band 74. A clamping bolt 82 with a T-shaped head 84, has its head received within the loop portion 78 with its stem portion extending through a slot in said loop portion. A T-shaped tubular guide member 86 is carried by the loop portion 80 similar to the manner in which the T-shaped bolt 82 is carried by the loop portion 78, the stem of said bolt passing through the tubular stem of said guide member 86. In addition a nut 88 on the stem of the bolt 82 is adapted to be threaded against the stem of the tubular guide 86 to draw the loop portions 78 and 80 together, thereby tightening the flexible band 74 about the semi-circular members 72. Obviously the invention is not limited to this specific means for drawing together the ends of the band 74.

The semi-circular members 72 are channel-shaped in cross-section with the channel sides extending inwardly for cooperation with the beads 60 and 62 to mechanically prevent axial separation of the nipple and intake pipe. Thus, as illustrated, the inner diameter of the sides of the channel-shaped members 72 is smaller than the outer diameter of the pipe beads 60 and 62. In addition, this shape of the rigid semi-circular members 72 prevents the annular resilient member 64 from blowing out if a high pressure should occur within the intake pipe. Also, the clamping engagement of the annular resilient member 64 about the flanges 56, 58, 60 and 62 effectively seals the interior of the intake pipe and at the same time permits limited flexibility between the intake pipe 54 and nipple 50.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In combination with a pair of pipes adapted to be secured together in end-to-end relation, each of said pipes having a first external annular bead at the end facing the other pipe and a second annular bead spaced from said first bead, an annular member of resilient rubber-like material having a plurality of preformed internal annular grooves, said annular member being disposed about and bridging the junction of said pipes with said beads extending into said grooves, a pair of semi-circular rigid members of inwardly opening channel-shaped cross-section disposed about said annular member with said annular member filling the space between the channel sides of said semi-circular members, the channel sides of said semi-circular members terminating in spaced relation to said pipes and each of said channel sides having an internal diameter less than the maximum diameter of the adjacent second bead, and a flexible band also bridging the adjacent ends of said pipes and having a width substantially equal to the width of said semi-circular members, said band being adapted to be tightly drawn about said semi-circular members.

2. In combination with a pair of conduits having annular beads adjacent the ends thereof: a packing ring encircling the adjoining ends of said conduits with the beads thereof disposed in annular grooves formed in the interior surface of said ring; a pair of arcuate segments substantially channel-shape in cross section disposed on opposite sides of said ring with the flanges thereof extending inwardly in engagement with the opposite edge faces of said ring; and means for drawing the segments together to compress said ring, said ring being of such a size relative to the size of said flanges that the inner diameter of the latter when said ring is compressed is less than the outer diameter of said beads.

3. In combination with a pair of conduits having annular beads adjacent the ends thereof: a packing ring encircling the adjoining ends of said conduits with the beads thereof disposed in annular grooves formed in the interior surface of said ring; a groove formed in the interior surface of said ring intermediate said bead-receiving grooves forming an annular chamber communicating with the interior of said conduits through the adjoining ends thereof; a pair of arcuate segments substantially channel-shape in cross-section disposed on opposite sides of said ring with the flanges thereof extending inwardly in engagement with the opposite edge faces of said ring; and means for drawing the segments together to circumferentially compress said ring between the same and said conduits, pressure within said conduits acting against the wall of said chamber increasing the circumferential compression of said ring, and augmenting the seal effected by the compression of said ring.

HENRY C. HILL.
WILLIAM H. FRANCISCO.

REFERENCES CITED

The following references are of record in the file of this patent:

UNITED STATES PATENTS

| Number | Name | Date |
| --- | --- | --- |
| 2,165,920 | Burnip | July 11, 1939 |

FOREIGN PATENTS

| Number | Country | Date |
| --- | --- | --- |
| 34,635 | Germany | Mar. 5, 1886 |
| 94,930 | France | May 2, 1872 |
| 355,620 | France | Sept. 6, 1905 |
| 354,184 | Italy | Nov. 15, 1937 |